United States Patent [19]

Ishikawa et al.

[11] Patent Number: 4,609,038

[45] Date of Patent: Sep. 2, 1986

[54] HEAT EXCHANGER USING A HYDROGEN OCCLUSION ALLOY

[75] Inventors: Hiroshi Ishikawa; Keisuke Oguro; Hiroshi Suzuki; Akihiko Kato; Teruya Okada; Shizuo Sakamoto; Iwao Nishimura, all of Osaka; Keizo Sakaguchi, Hyogo, all of Japan

[73] Assignees: Agency of Industrial Science & Technology, Tokyo; Kurimoto, Ltd., Osaka, both of Japan

[21] Appl. No.: 758,624

[22] Filed: Jul. 24, 1985

[30] Foreign Application Priority Data

Nov. 30, 1984 [JP] Japan .................................. 59-254416

[51] Int. Cl.⁴ ............................................. F17C 11/00
[52] U.S. Cl. ................................. 165/104.12; 62/48; 206/0.7
[58] Field of Search ....................... 165/104.12; 62/48; 206/0.7

[56] References Cited

U.S. PATENT DOCUMENTS 4,393,924  7/1983  Asami et al. ................... 165/104.12

FOREIGN PATENT DOCUMENTS 68448    6/1978  Japan .............................. 165/104.12
126199   9/1980  Japan ........................................ 62/48
158101  12/1980  Japan ........................................ 62/48

Primary Examiner—Albert W. Davis, Jr.
Attorney, Agent, or Firm—Jones, Tullar & Cooper

[57] ABSTRACT

This invention discloses a heat exchanger comprising a compact of hydrogen adsorption alloy formed by a process of coating surfaces of fine particles of hydrogen adsorption alloy composed principally of a metal hydride with a dissimilar metal by plating and either by a process of compression molding of the coated alloy or by a process of filling a heat-conductive porous material with the coated fine particles of hydrogen alloy followed by a process of compression molding thereof. By this arrangement, it becomes possible to improve such disadvantages of conventional heat exchanger using hydrogen adsorption alloy as a decline of heat conductivity caused by micronization of the hydrogen adsorption alloy as a result of repeated uses or a decline of filling rate of the alloy caused by collapse and dispersion of the fine particles of the alloy compact eventually bringing about a decline of the heat exchanging function.

11 Claims, 13 Drawing Figures

HEAT EXCHANGER USING A HYDROGEN OCCLUSION ALLOY

BACKGROUND OF THE INVENTION

1. Field of the Invention:

This invention relates to a heat exchanger using a hydrogen absorbing alloy being mainly composed of metal hydride and, more particularly, to a heat exchanger which has a hydrogen absorbing capacity, which is hard to be diminish in spite of repeated uses, which is small in size, which possess a high efficiency, and in which the adsorption and discharge of hydrogen is rapidly performed so as to be useful as an efficient hydrogen storing apparatus:

2. Prior Art:

Heretofore, there has been developed apparatus wherein hydrogen is adsorbed in a certain metal or alloy to be stored therein and transferred therefrom in the form of a metal hydride, the known apparatus has been further applied to such practical uses as the purification of hydrogen the design of heat pumps and air-conditioning systems, etc.

Since an exothermic reaction or an endothermic reaction necessarily takes place when the metal hydride adsorbs or discharges hydrogen, it is possible to make use of such a characteristic in a heat exchanger or a heat pump. In this connection, when it is intended to store or transfer the hydrogen, the delivery of hydrogen does not take place without rapid delivery of heat between the metal hydride and the outside.

However, a thermal conductivity of the hydrogen adsorption alloy itself is actually low and moreover the thermal conductivity is further lowered by the decay and micronization of the alloy along with repeated adsorptions and discharges of the hydrogen, resulting in lowering or a decline of the thermal efficiency or hydrogen adsorption capacity of the heat exchanger.

In order to overcome this problem, several attempts have been proposed to date. For example, the "Metal Hydride Reactor" disclosed in Japanese laid open patent Publication (unexamined) No. 57-61601 is characterized by holding a metal hydride in a network structure or a porous body accepted in a pressure vessel. According to one embodiment of the reactor disclosed in the 57-61601 publication, as is shown in the accompanying FIG. 12, a network (mesh-like) structure 6 comprising fine wires entwined with one another is inserted in a vessel thereby filling the vessel, and fine particles of 200 mesh pass to be held by the network structure, are infiltrated into the vessel 1a filling 50% thereof. In the vessel, heat exchange piping is arranged to serve as a heating medium reflux pipe 3, and both ends of the pipe 3 are respectively connected with an entry (supply port) 4a and an exit (exhaust port) 5a of heating medium or cooling medium. Hydrogen is introduced through inlet 2.

By the foregoing construction, it is reported that the metal hydride charged layer is improved with respect to heat conductivity by a factor of 1.9 times.

Another proposal embodiment entitled "Pressure Vessel Including a Hydrogen Adsorption member" disclosed in Japanese laid open (unexamined) Utility Model Publication No. 59-62399, and shown in the accompanying FIG. 13, is characterized by disposing hydrogen adsorbing members formed by partitioning the internal part of a vessel 1b into small spaces. To be more specific, multiple containers 7 for accepting hydrogen adsorbing members 8 are arranged in parallel in the vessel 1b. The hydrogen adsorbing members 8 are formed into a compact of square pillars, cylinders or the like and are inserted in the container 7. A drilled through hole 9 is formed through the center of each hydrogen adsorbing member 8. With such a structure, a large quantity of heat produced at the time of adsorption of the hydrogen is rapidly exchanged by the heating medium so that the reaction takes place smoothly. Fine particles in the hydrogen adsorption members 8 are prevented from being scattered or displaced when the hydrogen flows in and out.

A serious problem, however, exists in both of the foregoing two known embodiments, i.e., a rapid decline occurs in the hydrogen adsorption capacity of the hydrogen adsorption alloy itself. In other words, at an early stage of use, both of the known embodiments exhibit excellent thermal conductivity, enabling rapid adsorption and discharge of hydrogen, but with repeated and continuous use, the thermal conductivity is lowered in a rather short period of time due to the micronization etc. as a result, adsorption and discharging function decline.

Furthermore, since, when using either known embodiment, the micronization of the fine particles is unavoidable due to the decay thereof as a result of repeated expansion and contraction which takes place for every hydrogeneration and dehydrogeneration, there exists the possibility that the micronized metal hydride overcomes the constraining force of the mesh-like structure 6, drops out of the structure, and is scattered around the structure, resulting in a gradual lowering in the fine particle filling rate. Accordingly, and in the case of the second known embodiment, there exists the possibility that the compact of the hydrogen absorbing member 8 accepted in the container 7 decays and that the drilled hole is broken making it difficult to fully introduce the hydrogen gas in the longitudinal direction thereof. Moreover, the micronized fine particles are consolidated by the repeated adsorption and discharge of hydrogen, which may bring about the deformation and breakage of the container due to abnormal forces applied partially to the container. Besides, when using the second known embodiment, satisfactory workability is not secured in the process of drilling an aperture through the compact molded by compressing the fine particles of hydrogen adsorption alloy, resulting in a rough and poor finish.

In this way, in the case of the known heat exchangers, the disadvantages of decline or deterioration of heat exchanging function due to the lowering of thermal conductivity of the powdered metal hydride, decay and scattering of the fine particles along with repeated uses of the heat exchanger, still remain.

SUMMARY OF THE INVENTION

It is therefore an object of this invention to provide a heat exchanger using a hydrogen adsorption alloy the function of which is not lowered in a short period of time in spite of repeated uses, thereby overcoming the above-noted problems.

The foregoing object is accomplished by providing a heat exchanger using a hydrogen adsorption alloy wherein surfaces of fine particles of hydrogen adsorption alloy are coated with dissimilar metals by plating. The alloy is formed into a compact of hydrogen adsorption alloy by compression molding. A through hole is formed through the compact, a heat exchanging pipe is inserted in the through hole for direct contact, and each end of the through hole is communicated respectively with an inlet and an exit of heating medium or cooling medium.

In this connection, the fine particle materials to be used, preferably in the hydrogen adsorption alloy, are lanthanum-nickle, misch metal-nickel, misch metal-nickel-aluminum, iron-titanium, titanium-manganese, calcium-nickel, magnesium-copper, magnesium-nickel. Preferably dissimilar metals are copper, nickel, etc. Any coating method such as electroplating, vacuum evaporation or immersion electroless plating is available, although a reduction electroless plating is particularly preferred.

The subject matter as set forth in appended claims 4 to 7 represents a variant of the invention (hereinafter referred to as "the variant") which has, as a substantial part of its indispensable constituent features, the whole part of the indispensable constituent features of the invention set forth in claims 1 to 3 (hereinafter referred to as "the specified invention") and which further effectively achieves the same purpose of the specified invention. In other words, the variant comprises additional means for forming a compact 18 of hydrogen adsorption alloy wherein after coating the surface of fine particles of hydrogen adsorption alloy with dissimilar metal by plating, the fine particles are charged in a heat-conductive porous member, and the porous materials are formed into a compact 18 of hydrogen adsorption alloy by compression molding.

As for the heat-conductive porous materials, it is possible to employ a foamed metal, a compressed metallic fiber bundle, or a compressed metallic powder of rough crystal, although the foamed metal is particularly preferred.

Thus a compact 15 or 18 is obtained by compression molding of the fine particles of metal hydride being appropriately processed according to every requirement of the aforementioned structure. This compact 15 or 18 has a through hole 16 provided at the time of molding or after molding. A heat exchanging pipe 17 for direct contact is inserted in the hole 16, and both ends of the pipe 17 are respectively communicated with an inlet 13 and an outlet 14 of a heating medium or a cooling medium.

As is conventionally employed, a pressure vessel 11 is provided with a hydrogen inlet 12 so as to be connected with an external source of hydrogen gas and a closing valve.

When hydrogen is supplied from the external source of hydrogen gas to the hydrogen inlet 12, the pressure vessel 11 is filled with hydrogen and with a further pressurized supply, the hydrogen is adsorbed in the compact 15 or 18 of hydrogen adsorption alloy disposed in the vessel 11, and the metal is hydrogenerated and at this moment a large quantity of heat is produced.

On the other hand, when a cooling medium (cooling water, for example) is supplied concurrently with the above operation from the inlet 13 to the heat exchanging pipe 17 inserted through the compact 15 or 18, the cooling medium rapidly absorbs the heat produced in the compact and carried it out through the outlet 14.

When a heating medium (steam, for example) is introduced into the heat exchanging pipe 17 during the period of adsorption of hydrogen in the compact 15 (or 18), the compact absorbs the heat of the heating medium while discharging hydrogen gas, thereby lowering the temperature of the heating medium, and the heating medium of lowered temperature is discharged through the outlet 14. The discharged hydrogen gas is taken out of the vessel 11 through the hydrogen inlet 12 to be accepted in the internal tank, etc.

As a result of the foregoing arrangement and function, the invention has the following advantages.

First, the surfaces of fine particles of materials of hydrogen adsorption alloy are coated with dissimilar metal, that is, an encapsulation is performed. By appropriately satisfying individual requirements, a uniform and highly adhesive coating is obtained. The coated film has a crystal structure which does not obstruct the passage of hydrogen, but prevents the passage of other impurities. Furthermore, individual surfaces of the fine particles are prevented from producing an oxide film by the masking effect of the coated film. Accordingly, lowering of the adsorptive capacity of the hydrogen adsorption alloy is prevented due to the deterioration (inactivation) of the elements of hydrogen adsorption alloy.

Moreover, since the coated film serves as an outer shell, the fine particles are prevented from micronization due to decay thereof. As a result lowering of the adsorption capacity of the hydrogen adsorption alloy is prevented due to the heat conductivity decline, and the problem of decay and scattering is also effectively solved.

Secondly, with regard to advantages obtained by the compression molding of the pretreated material, since the surfaces of fine particles are coated (encapsulated) with a highly heat-conductive dissimilar metal and compressed, outer electrons of the metal atom in the surface are in a state of covalence and bring about a press fitting effect. As a result, high physical strength and heat conductivity are obtained.

An optional shape of the heat exchanging part can be formed by appropriately selecting a metal mold. When forming preliminarily a linear or curved concaved groove by means of a metal mold, a smooth and delicate surface of the heat exchanging part with high surface stability but without roughness and decay is obtained as compared with drilling after formation.

In this connection, even when providing the groove by drilling after formation of the heat exchanging part, the problem of a rough surface is greatly improved as compared with the known devices.

The foregoing advantages are further promoted by the variant invention. Since the encapsulated fine particles are charged in the spaces of the porous and heat-conductive base material to be formed by compression molding, a successful unification is attained between the porous material and the surfaces of the fine particles as well as between the surfaces of the fine particles by press fitting, a high heat conductivity being secured thereby. Furthermore, since the force for retaining the fine particles is sufficient, the fine particles are hardly separated from the solid compact and scattered.

In addition, since the heat exchanging pipe is directly inserted in the hole running through the inside of the compact, heat exchange between the heating medium and the compact rapidly takes place, and furthermore since multiple pipes can be disposed due to the sufficient physical strength of the compact, it is possible to design the heat exchanger in accordance with the ordinary structure of a conventional heat exchanger system and perform a high efficiency as compared with the existing heat exchangers of this type.

Other features and advantages of this invention will become apparent in the course of the following description together with the accompanying drawings.

BRIEF DESCRIPTION OF THE DRAWING

In the drawings forming a part of this application, and wherein like parts are designated reference numerals or characters through the same.

DESCRIPTION OF THE PREFERRED EMBODIMENTS

Figure 1:
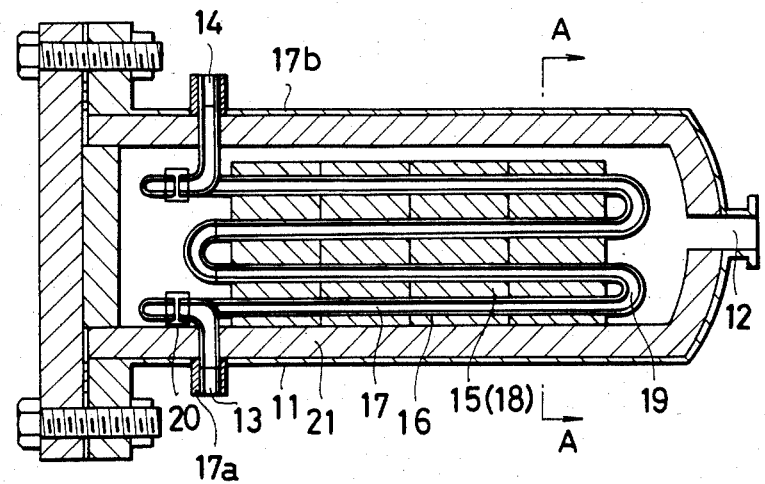
FIGS. 1 and 2 are a sectional front view and a sectional side view respectively showing a first embodiment of this invention.

Referring now to the accompanying drawings and to some of the preferred embodiments of the invention, a Mn Ni$_{4.5}$Mn$_{0.5}$ is transformed to a powdered material of fine particles of which the average grain size is approximately 15 μm by repeating the absorption and discharge of hydrogen. Then after being degreased and cleaned, the powdered material is coated with copper by means of a wet electroless plating of autocatalysis using a reducer. In this process, the powdered material is directly immersed into a plating solution for surface reaction thereof, but when the initiation reaction is insufficient, the powdered material is immersed in a known activator solution containing a palladium salt for activation treatment.

In this autocatalytic electroless plating with copper using a reducer, a formaldehyde is used as the reducer, and a plated film of approximately 1 μm in thickness is formed by the plating process for about 40 minutes at 30° C. while stirring an electroless plating solution of TMP chemical copper #500 (produced by Okuno Chemical Industries Co., Ltd.). After the surface reaction, the fine particles are washed in water and dried under a low temperature.

The fine particles are then subjected to compression molding by means of a hydraulic press, and a suitable pressure of approximately 5 T/cm$^2$ is applied.

Referring now to an embodiment of the variant invention, the powdered material of alloy plating as described above is placed on a foamed aluminum member, i.e., a porous member (trade name: Duocel produced by Energy Research and Generation Co.), and the fine particles are infiltrated into inner vacant spaces of the porous material through pores on the surface thereof by vibrating the whole. It is necessary for every vacant space to be in communication with the surface of the foamed member as well as to have a larger pore diameter than that of each of the fine particles. In view of practical manufacturing convenience, the preferable pore diameter is within the range of 1~3 mm. The foamed aluminum member with fine particles impregnated in this manner by vibration is then formed into a compact 18 by compression molding in which a static load of no more than 5 T/cm$^2$ is applied to the foamed aluminum member so that the thickness thereof is reduced to about 40% (or by 60% by compression).

It is also possible to use such porous material as aluminum honeycomb core (trade name: Hivex Core produced by the Yokohama Rubber Co., Ltd.), foamed nickel (trade name: Celmet produced by Sumitomo Electric Industry Co., Ltd.) or stainless three dimensional mesh structure (trade name: P.P. Mesh Demister produced by Sankyo Tokushu Kanaami Kako Co., Ltd.). These porous materials are different with respect to the manufacturing principle and the shape of the vacant spaces, but have common characteristics that the vacant spaces are communicated with the surface of the compact, and that the pore diameter is larger than that of each of the fine particles, i.e., for practical use, no more than 1~3 mm of apertures are on the surface of these materials.

Figure 2:
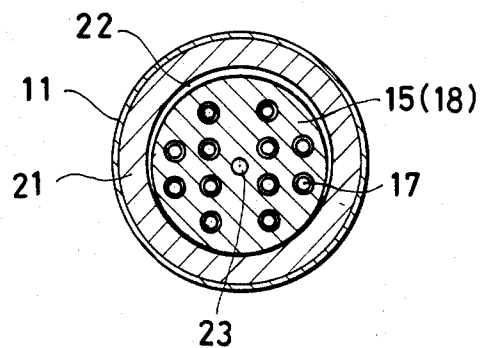

The shape of the compact 15 (or 18) can be freely selected, but FIG. 1 shows a sectional front view of the most typical shape thereof as a first embodiment and FIG. 2 shows a sectional side view taken along the line A—A of FIG. 1, and wherein the compact comprises fine particles of hydrogen adsorption alloy formed to a shape a cylinder in which multiple pores 16 are provided like honeycomb. The pores are positioned so as to communicate with one another and are connected with one another in the longitudinal direction of the vessel 11. Heat exchanging pipes 17 are inserted through the pores 16 so as to come in direct contact with the compact. The pipes are disposed in a winding fashion (back and forth) inside the compact 15 (or 18) so as to form a passage being bent by bend pipes outside the compact while being communicated with one another as is shown in FIG. 1. Further, both ends of the passage are communicated with a supply inlet 13 and an exhaust outlet 14 of a heating medium through couplings 20. As for the material of the pipes 17, it is preferred to use a special steel (such as stainless steel) or a copper alloy which is resistant against hydrogen embrittlement.

A heat insulating material 21 is provided to cover the inner wall of the vessel 11. It is also possible to cover the outer wall of the vessel 11 with this heat insulating material.

Thus, in the case of the first embodiment, since the cylindrical compact with its diameter slightly smaller than the inner diameter of the cylindrical vessel (or the heat insulating material), a space 22 is produced therebetween caused by such difference in diameter, and this space 22 serves as a passage for hydrogen, and furthermore in order to accelerate contact with hydrogen and promote the hydrogenation as much as possible, it is also preferred to form a partial cutout portion or a plurality of hydrogen flowing pores 23 on the outer periphery of the compact.

Figure 3:
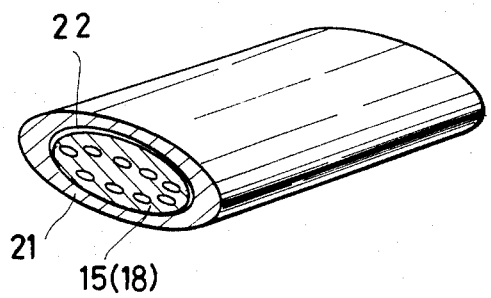
FIGS. 3 and 4 are perspective view respectively showing a second and a third embodiment.
Figure 4:
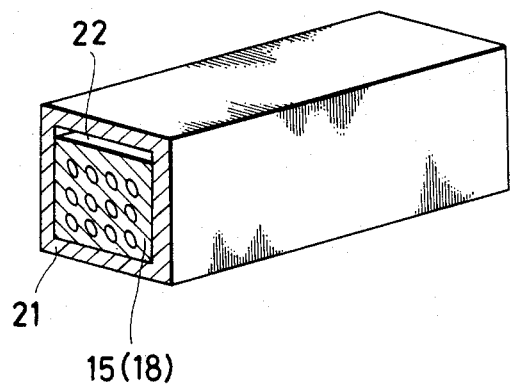

FIG. 3 and FIG. 4 are sectional perspective views respectively showing a second embodiment and a third embodiment.

Figure 5:
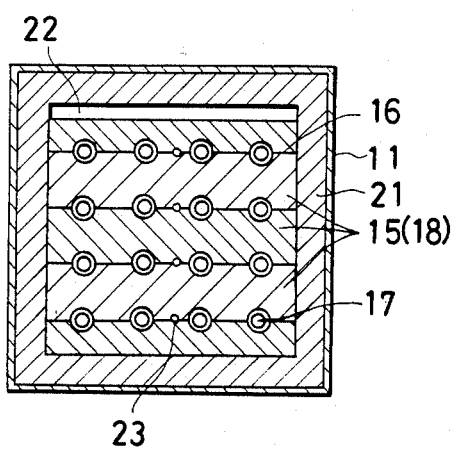
FIG. 5 is a sectional side view showing a fourth embodiment.

FIG. 5 is a sectional side view of a fourth embodiment in which the compact 15 (or 18) is divided along the longitudinal direction of the vessel 21 to be superposed or stacked with one another. In this embodiment when forming a compact, a preliminary working is applied thereto so that longitudinal concave grooves are formed on the mating face, and by superposing one concave groove on the other concave groove in order, the required pores are necessarily formed therebetween, and as a result it is not necessary to additionally have a perforation after formation of the compact.

FIGS. 6 to 11 show several embodiments in which headers 24, 25 are respectively provided on the supply inlet side and the exhaust outlet side of the heating medium, and in which multiple heat exchanging pipes 17 are provided passing through the compact 15 (or 18) between both headers. In these figures the pressure vessel 11 and the heat insulating material 21 are omitted in order to show an outline of the heat exchanging section.

Figure 6:
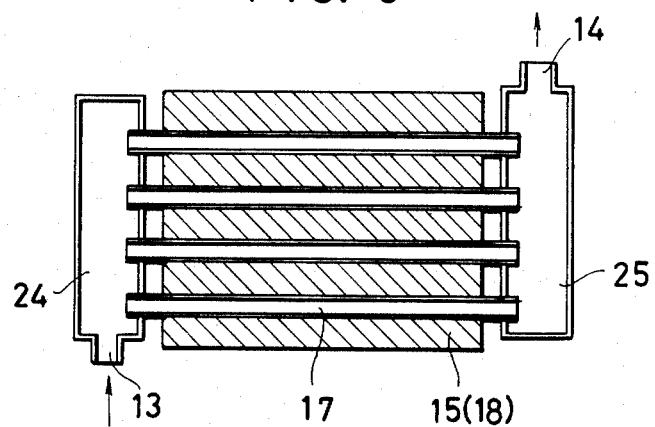
FIGS. 6 and 7 are sectional front views respectively showing a fifth and a sixth embodiment.
Figure 7:
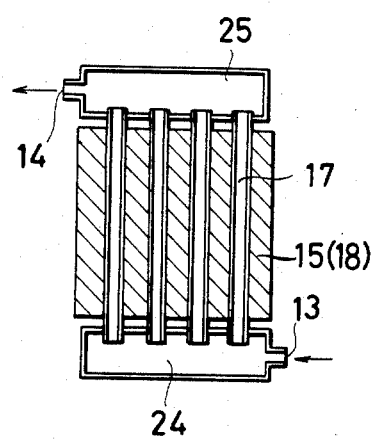
Figure 8:
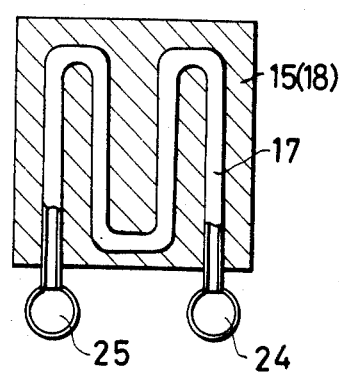
FIGS. 8 and 9 are sectional plan views respectively showing a seventh and a eighth embodiment.
Figure 9:
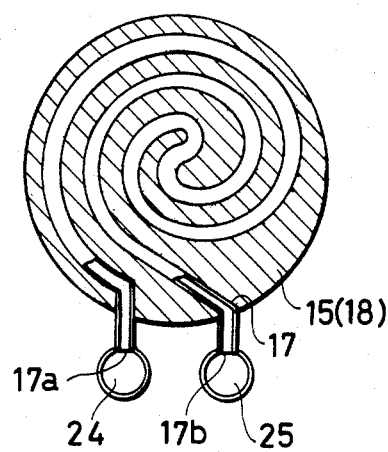
Figure 10:
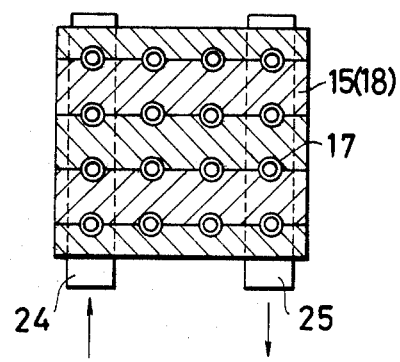
FIG. 10 is a sectional side view common in the fifth to eighth embodiment.

To be more specific, FIG. 6 is a sectional front view of a horizontal type straight tube heat exchanging section, and FIG. 7 is a sectional front view of a vertical type straight tube heat exchanging section, respectively. FIG. 8 is a sectional view of a W-shaped heat exchanging pipe 17 and FIG. 9 is a sectional view of a snaky heat exchanging pipe 17, respectively. Then by superposing these several different combinations of the compact with the pipe, a multi-layer heat exchanging unit is formed as is shown in FIG. 10 and both end thereof are respectively communicated with the common headers 24, 25. As a matter of course, both horizontal type and vertical type are applicable to the heat exchanger of this invention.

Figure 11:
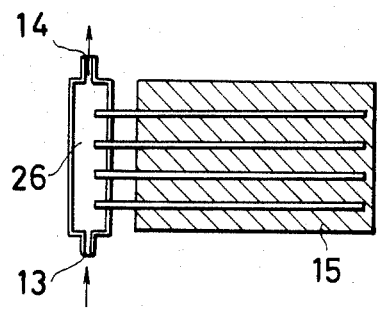
FIG. 11 is a sectional front view showing one example in which this invention is applied to a heat pipe.
Figure 12:
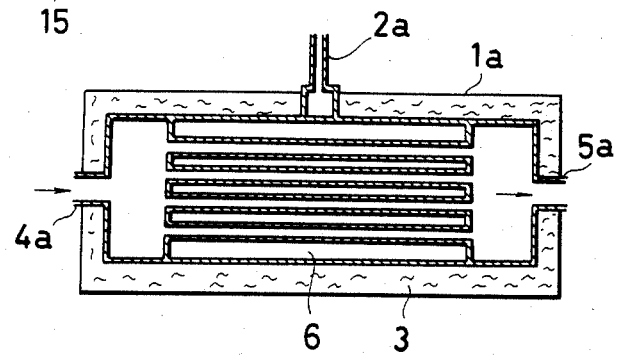
FIGS. 12 and 13 are sectional front views respectively showing separate known prior art.
Figure 13:
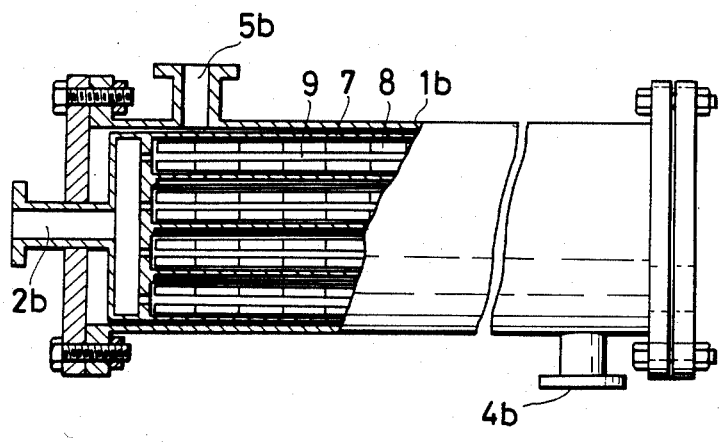

FIG. 11 is a sectional front view of one example in which the arrangement is applied to a heat pipe, and in which the heat exchanging pipe 17 is inserted in the inner part of the compact 15 (or 18), and only one end of the pipe 17 is communicated with a header 26 serving also as a heat pipe, while the other end remains inside the compact 15 (or 18). Both ends of the header 26 are in communication respectively with a supply inlet and an exhaust outlet of the heating medium or the cooling medium.

Having described the invention as related to the embodiments shown in the accompanying drawings, it is believed obvious that modifications and variations of the invention are possible in light of the above teaching. The scope of the invention, therefore, is to be determined solely by the following claims.

What is claimed is:

1. A heat exchanger using a hydrogen adsorption alloy arranged in a pressure vessel 11 equipped with a hydrogen supply inlet 12, a heating medium or cooling medium supply inlet 13 and an exhaust outlet 14 thereof, said heat exchanger being characterized in that surfaces of fine particles of hydrogen adsorption alloy are coated with a dissimilar metal by plating, the coated fine particles are then formed into a compact 15 of hydrogen adsorption alloy by compression molding, said compact 15 is provided with through holes 16 in which heat exchanging pipes 17 are inserted for direct contact therewith, and the ends of each pipe 17 are respectively communicated with said supply inlet 13 and with said exhaust outlet 14.

2. A heat exchanger using a hydrogen adsorption alloy as set forth in claim 1, wherein said dissimilar metal is a nickel and/or a copper.

3. A heat exchanger using a hydrogen adsorption alloy as set forth in claim 1, wherein said plating is an autocatalytic type wet electroless plating using a reducer.

4. A heat exchanger using a hydrogen adsorption alloy arranged in a pressure vessel 11 being equipped with a hydrogen supply inlet 12, a heating medium or cooling medium supply inlet 13 and an exhaust outlet 14 thereof, said heat exchanger being characterized in that surface of fine particles of hydrogen alloy are coated with a dissimilar metal, a porous material of high heat conductivity is infiltrated with said fine particles to be formed into a compact 18 of hydrogen adsorption alloy by compression molding, said compact 18 is provided with through holes 16 in which heat exchanging pipes 17 are inserted for direct contact therewith, and the of each pipe 17 are respectively communicated with said supply inlet 13 and said exhaust outlet 14.

5. A heat exchanger using a hydrogen adsorption alloy as set forth in claim 4, wherein said dissimilar metal is a nickel and/or a copper.

6. A heat exchanger using a hydrogen adsorption alloy as set forth in claim 4, wherein said plating is an autocatalytic type wet electroless plating using a reducer.

7. A heat exchanger using a hydrogen adsorption alloy as set forth in claim 4, wherein said porous member is a metallic porous structure.

8. A heat exchanger using a hydrogen adsorption alloy as set forth in claim 5, wherein said plating is an autocatalytic type wet electroless plating using a reducer.

9. A heat exchanger using a hydrogen adsorption alloy as set forth in claim 5, wherein said porous member is a metallic porous structure.

10. A heat exchanger using a hydrogen adsorption alloy as set forth in claim 6, wherein said porous member is a metallic porous structure.

11. A heat exchanger using a hydrogen adsorption alloy as set forth in claim 8, wherein said porous member is a metallic porous structure.

* * * * *